United States Patent [19]
Sonobe

[11] 3,906,842
[45] Sept. 23, 1975

[54] VARIABLE METERING PUMP

[75] Inventor: Kiyomi Sonobe, Tokyo, Japan

[73] Assignee: Iwaki Co., Ltd., Tokyo, Japan

[22] Filed: June 5, 1974

[21] Appl. No.: 476,732

Related U.S. Application Data
[63] Continuation of Ser. No. 327,303, Jan. 29, 1973, abandoned.

[30] Foreign Application Priority Data
Jan. 31, 1972  Japan................. 47-12948[U]

[52] U.S. Cl.............. 92/13.1; 74/571 R; 74/600; 92/13.41; 92/13.7; 417/221
[51] Int. Cl.²..................... F01B 31/14; F15B 15/24
[58] Field of Search ....... 92/13.1, 13.3, 13.4, 13.41, 92/13.5, 13.7, 13.8, 116, 12.1; 417/218, 219, 220, 221; 74/571 R, 600

[56] References Cited
UNITED STATES PATENTS

| | | | |
|---|---|---|---|
| 1,982,958 | 12/1934 | Kraus | 417/221 X |
| 2,005,227 | 6/1935 | Johnson | 74/571 R X |
| 2,115,121 | 4/1938 | Phillips | 417/221 X |
| 2,257,854 | 10/1941 | Peterson | 417/221 X |
| 2,539,277 | 1/1951 | Schroepfer | 417/221 X |
| 2,568,357 | 9/1951 | Moulden | 417/221 X |
| 2,592,237 | 4/1952 | Bradley | 74/571 R |
| 2,851,952 | 9/1958 | Lane | 417/221 X |
| 2,957,422 | 10/1960 | Loeber | 92/13.7 X |
| 3,153,909 | 10/1964 | Balaban | 417/221 X |
| 3,171,287 | 3/1965 | Jesse | 92/13.7 X |
| 3,628,889 | 12/1971 | Kobayashi et al. | 417/221 |
| 3,698,288 | 10/1972 | Sonobe | 74/600 X |
| 3,738,230 | 6/1973 | Censi | 92/13.3 |

Primary Examiner—Martin P. Schwadron
Assistant Examiner—Abraham Hershkovitz
Attorney, Agent, or Firm—Edward H. Loveman

[57] ABSTRACT

A variable metering pump comprising an eccentric cam disk fixed to a rotary shaft, an eccentric cam ring surrounding said cam disk, helical engagement means for effecting engagement between said cam disk and cam ring, and a plunger which makes a reciprocating motion according to the eccentricity of rotation of said cam ring, wherein the vertical movement of the cam disk causes the cam ring to make a varying eccentric rotation by the engagement means for adjustment of the stroke of the plunger.

12 Claims, 8 Drawing Figures

VARIABLE METERING PUMP

This is a continuation of application Ser. No. 327,303, filed Jan. 29, 1973, now abandoned.

This invention relates to a plunger pump and more particularly to a variable metering pump.

Such type of pump known to date consists in adjusting the eccentricity of rotation of a double eccentricity mechanism to vary the stroke length of a plunger. However, the prior art pump has the drawbacks that it has a complicated construction, resulting in its bulkiness, requires time-consuming work during manufacture and moreover fails accurately to control the plunger stroke during pump running operation.

It is accordingly an object of this invention to provide a variable metering pump capable of accurately controlling the amount of discharge by means of a very simple adjustment mechanism.

Another object of the invention is to provide a variable metering pump enabling the automatic control of discharge.

Still another object of the invention is to provide a variable metering pump provided with a lubricating system for effecting the automatic lubrication of rotating and reciprocating parts.

A variable metering pump according to the invention comprises a double eccentric cam mechanism consisting of an eccentric cam disk eccentrically fixed to a main shaft and an eccentric cam ring surrounding the cam disk; a mechanism for converting the rotation of the main shaft to a reciprocating movement according to the eccentricity which the eccentric cam ring bears during rotation with the main shaft; and a plunger making a reciprocating movement through the conversion mechanism with the stroke corresponding to the eccentricity or rotation of the eccentric cam ring. The eccentric cam disk and eccentric cam ring have helical guide means formed in the engagement surfaces of the eccentric cam disk and eccentric cam ring. When, therefore, the eccentric cam disk makes a vertical movement, the eccentric cam ring varies the eccentricity of its rotation according to the helical angle of the helical guide means, thereby adjusting the plunger stroke.

A variable metering pump according to the invention can easily adjust the plunger stroke simply by the vertical movement of the main shaft even during operation. The rate of said adjustment is determined by the amount of vertical movement of the main shaft and the helical angle of the helical guide means. Namely, where the helical guide means have a large helical angle, then the plunger stroke can be widely varied by a small vertical movement of the main shaft. Where said helical angle is small, then the plunger stroke can be adjusted very minutely.

The present invention will be more fully understood from the following detailed description when taken in connection with reference to the accompanying drawings, in which.

Figure 6:
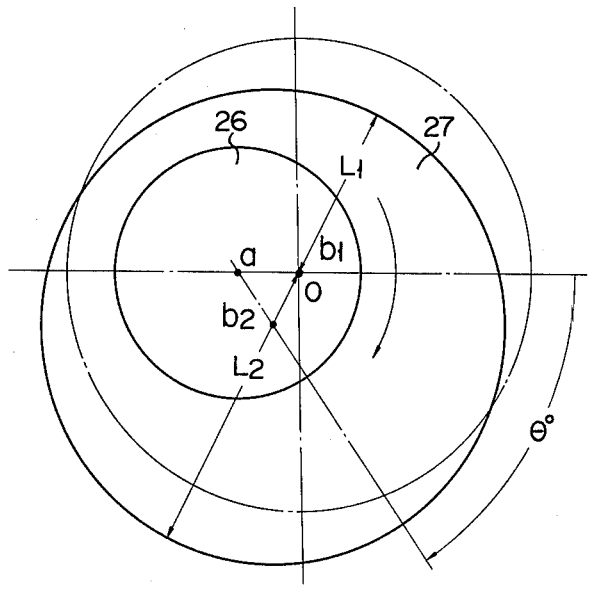
Figure 7:
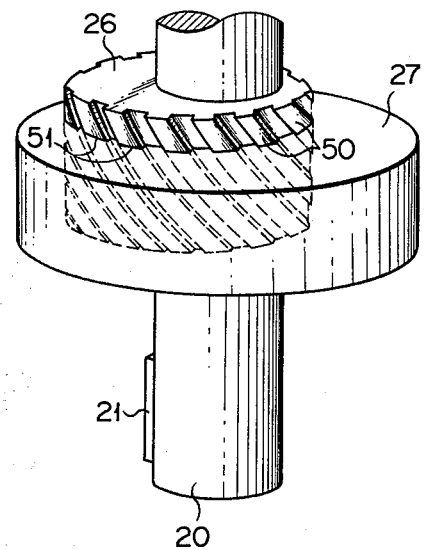
Figure 8:
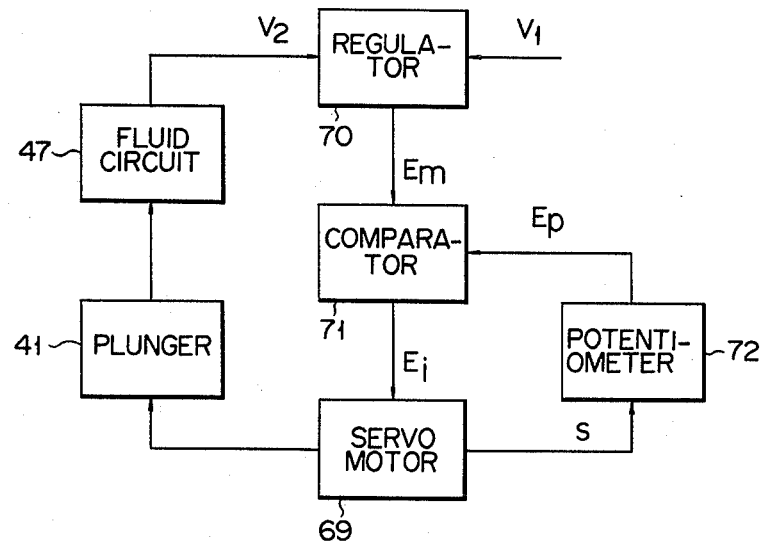

FIG. 6 presents the principle by which the plunger stroke is made to have a prescribed relationship with the eccentricity of rotation of the eccentric cam ring;

FIG. 7 is a perspective view of an assembly of a modified eccentric cam disk and a modified eccentric cam ring; and FIG. 8 is a block circuit diagram illustrating the operation of a servo system included in a plunger stroke adjusting mechanism.

Figure 1:
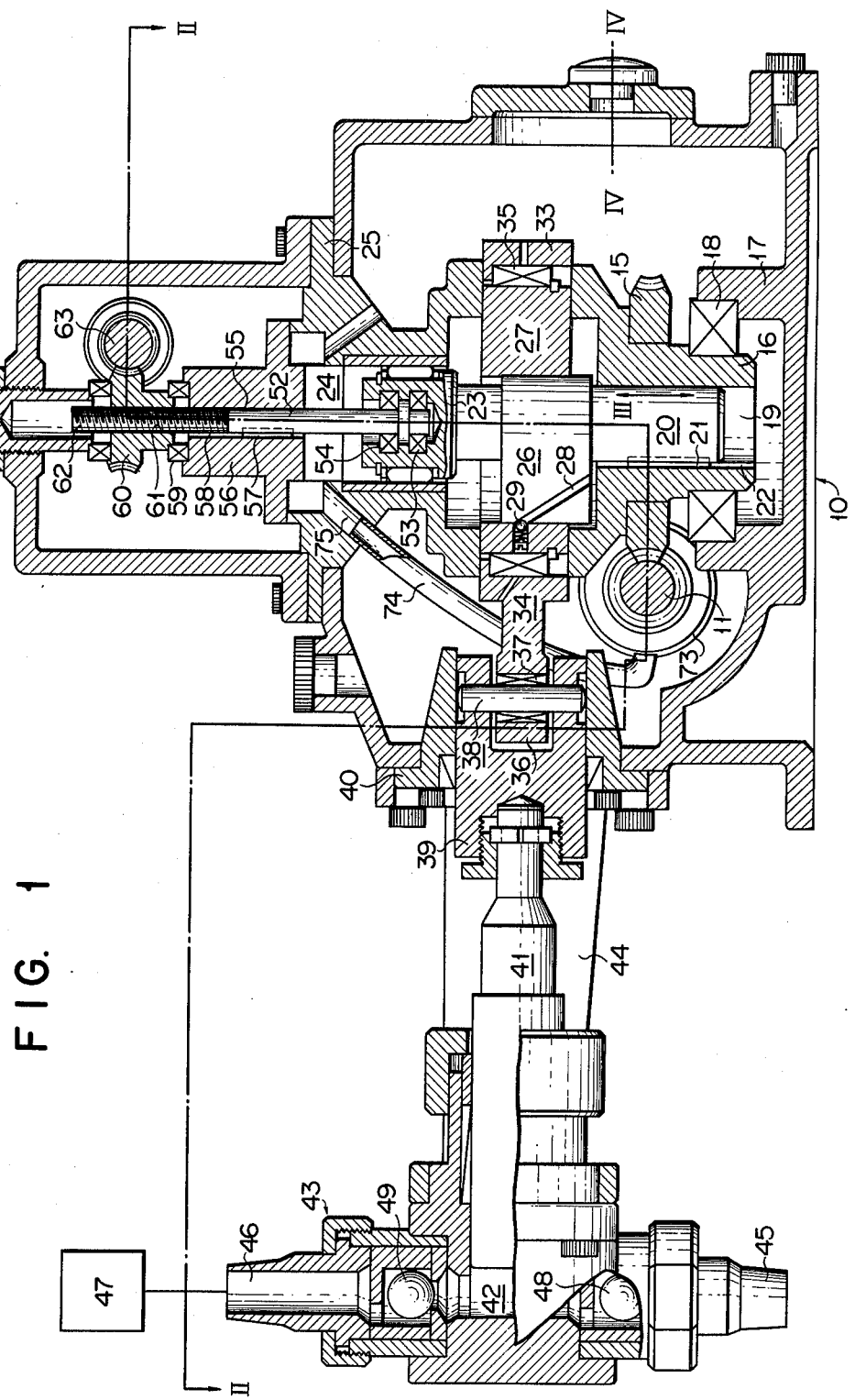
FIG. 1 is a longitudinal sectional view of a variable metering pump of this invention.
Figure 2:
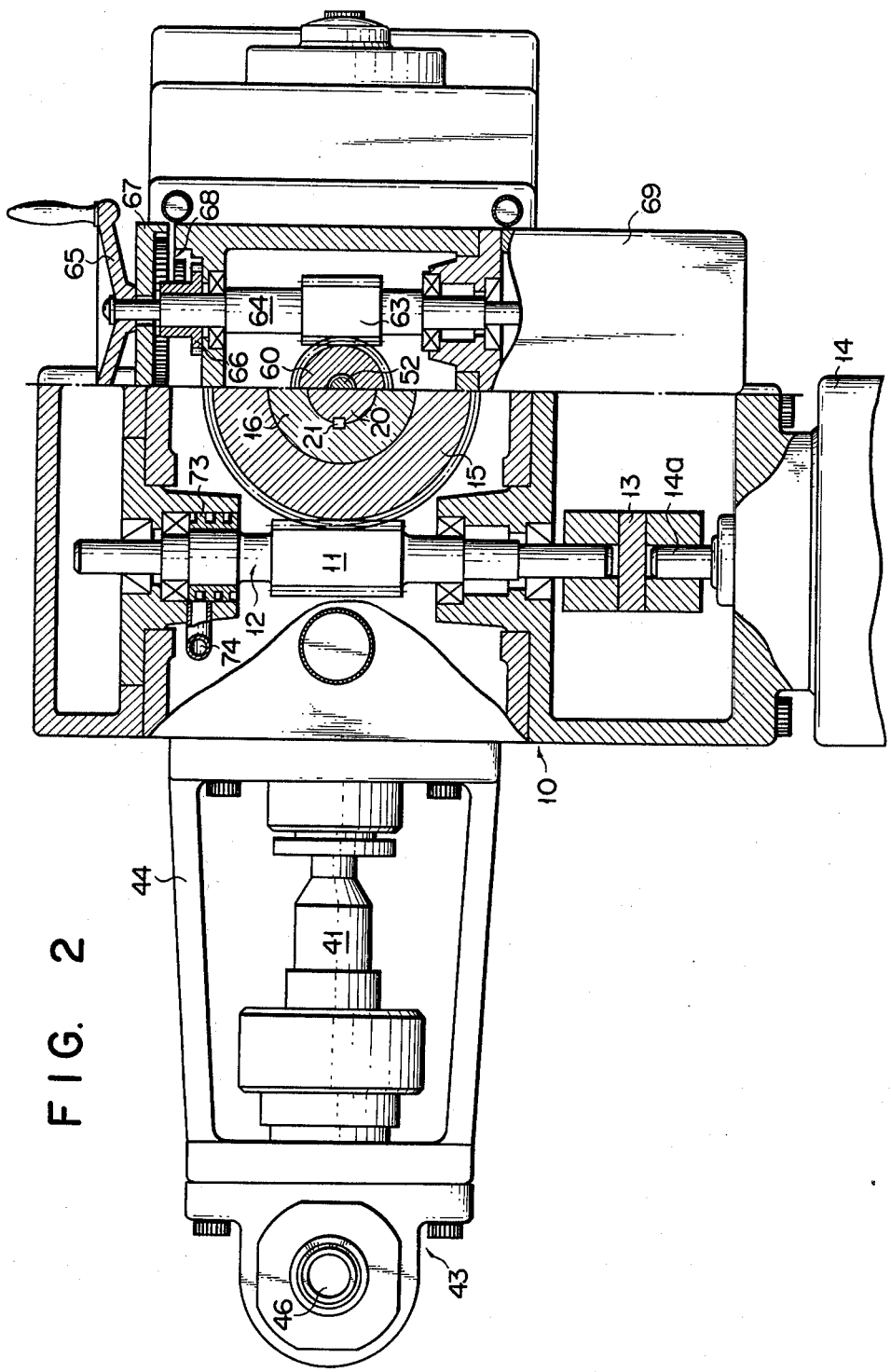
FIG. 2 is a sectional view on line II—II of FIG. 1.

Referring to FIGS. 1 and 2, a variable metering pump according to this invention has a housing 10 and a first worm 11 pivotally supported therein. A shaft 12 of the worm 11 is connected at one end of a shaft 14a of a drive motor 14 through a coupling 13 so as to be driven thereby (FIG. 2). The worm 11 engages a worm wheel 15 fixed to a rotatable member 16, which is rotatably held by means of a bearing 18 in a rest 17 provided at the bottom of the housing 10. The rotatable member 16 is bored at the center with a hole 19, into which there is inserted a main shaft 20. On the outer wall of the main shaft 20 is mounted a key 21 extending in the axial direction of said shaft 20. The key 21 slidably engages a keyway 22 cut out in the inner wall of the hole 19. Accordingly, though jointly rotatable with the rotatable member 16, the main shaft 20 can move in the axial direction, namely, in the direction of the indicated arrow III independently of said rotatable member 16. The larger diameter head 23 mounted on the top end of the main shaft 22 is supported rotatably and slidably in a cylindrical cavity 24 of an upper rest 25 fixed to the upper portion of the housing 10.

Figure 3:
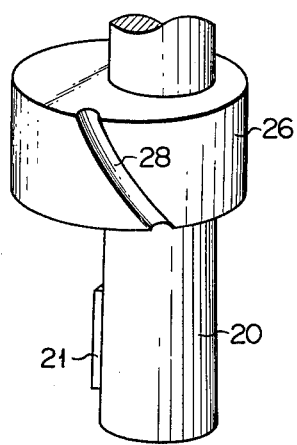
FIG. 3 is a perspective view of an eccentric cam disk embodying the invention.
Figure 4:
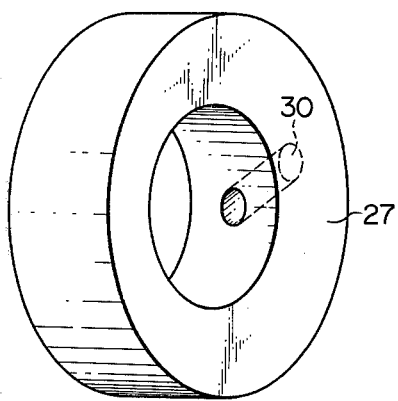
FIG. 4 is a perspective view of an eccentric cam ring embodying the invention.
Figure 5:
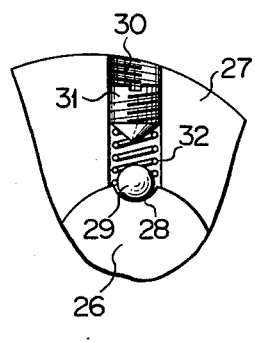
FIG. 5 is a fractional sectional view of the engagement portions of the eccentric cam disk and eccentric cam ring.

The variable metering pump of this invention includes a double eccentric cam mechanism consisting of an eccentric cam disk 26 (FIG. 1) fixed at the intermediate part of the main shaft 20 in eccentric relationship therewith and an eccentric cam ring 27 slidably surrounding the peripheral wall of the eccentric cam disk 26 and prevented from axially moving by the rotatable member 16 and the upper rest 25. The eccentric cam ring 27 bears the same degree of eccentricity with the eccentric cam disk 26, as does the latter with the main shaft 20. In the peripheral wall of the eccentric cam disk 26 is cut out a helical keyway 28, into which there is fitted a hard ball 29 projecting from the inner wall of the eccentric cam ring 27 (FIGS. 3, 4 and 5). The ball 29 is received in a threaded hole 30 penetrating the inner and outer walls of the eccentric cam ring 27 and normally pressed against the bottom of the helical keyway 28 through a coil spring 32 by a screw 31 fitted into said threaded hole 30. When, therefore, the main shaft 20 rotates, the eccentric cam ring 27 also rotates jointly with the eccentric cam disk 26. When, however, the main shaft 20 and in consequence the eccentric cam disk 26 move in the direction of the indicated arrow III, the eccentric cam ring 27 eccentrically rotates with respect to the eccentric cam disk 26 according to the helical angle of the helical keyway 28, and presents a varying degree of eccentricity with respect to the main shaft 20. To the peripheral wall of the eccentric cam ring 27 is rotatably fitted through a bearing 35 (FIG. 1) a first annular ring 33 disposed at one end of a connecting rod 34. At the opposite end of said connecting rod 34 is provided a second annular ring 36, which surrounds through a bearing 37 a pin 38 pivotally fitted to one end of a cross head 39. The cross head 39 slidably penetrates a cylindrical member 40 fitted to the side wall of the housing 10. To the outer end of the cross head 39 is firmly fixed a plunger 41.

When the eccentric cam ring 27 is rotated by the main shaft 20 and eccentric cam disk 26, the connecting rod 34 converts the eccentric rotating movement of the eccentric cam ring 27 to a reciprocating movement according to the eccentricity which said eccentric cam ring 27 bears with the main shaft 20, and transmits the resulting reciprocating movement to the plunger 41, making the plunger stroke correspond to the eccentricity of rotation of the eccentric cam ring 27.

The outer end of the plunger 41 is slidably inserted liquid-tight into a cylindrical chamber 42 of a pump unit 43 held in the housing 10 by means of a bracket 44. The cylindrical chamber 42 is fitted at one end with an inlet 45 communicating with, for example, a fluid tank (not shown) and at the opposite end with an outlet 46 connected to a fluid circuit 47. Between the cylindrical chamber 42 and the inlet 45, as well as between said chamber 42 and the outlet 46, are provided check valves 48 and 49 respectively, thus always causing a fluid to run from the inlet 45 to the outlet 46 when the plunger makes a reciprocating movement.

As described above, the present invention adjusts the stroke length of the plunger 41 by varying the eccentricity which the eccentric cam ring 27 bears during rotation with the main shaft 20. Referring to FIG. 6, the centers of the main shaft 20, eccentric cam disk 26 and eccentric cam ring 27 are indicated by O, $a$ and $b_1$. Where the point $b_1$ falls on the point O, then the eccentric cam ring 27 assumes an outline indicated in a chain line. At this time, the eccentric cam ring 27 is made concentric with the main shaft, preventing the plunger 41 from making a reciprocating movement even when the main shaft 20 rotates.

Now let it be assumed that the main shaft and in consequence the eccentric cam disk 26 move in the direction of the indicated arrow III of FIG. 1. Then the eccentric cam ring 27 is rotated through an angle of $\theta°$ about the point $a$ by the joint action of the helical keyway 28 and ball 29. At this time, the eccentric cam ring 27 has its center $b_1$ shifted to a point $b_2$, and is brought to the solid line position. The variable metering pump of this invention rotates about the main shaft 20, namely, about the point O, causing the eccentricity of the eccentric cam ring 27 with respect to the point O to give rise to the corresponding reciprocation of this connecting rod 34. The stroke length of the reciprocating movement transmitted to the plunger 41 through the connecting rod 34 may be indicated as $L_2$ (longest distance from point O to cam ring periphery) $- L_1$ (shortest distance from point O to cam ring periphery). Said stroke length is just twice the distance from $b_1$ to $b_2$ covered by the center $b_1$ of the eccentric cam ring 27 during rotation.

FIG. 7 presents a modification of the double eccentric cam mechanism of this invention. The eccentric dam disk 26 of FIGS. 1 – 6 is formed as an eccentric worm members 26' with a plurality of helical spline teeth 50 projectively arranged all around the periphery thereof. The eccentric cam ring 27 of FIGS. 1 – 6 is formed as an eccentric internal gear member 27' by having the inner peripheral wall thereof cut with a plurality of helical spline grooves 51 which mate with said spline teeth 50. When the eccentric worm member 26' moves vertically, the internal gear member 27' rotates as in the preceding case, relative to the eccentric worm member 26' according to the helical angle of the helical spline teeth 50. According to this modification, the torque of the eccentric worm member 26' is uniformly transmitted to the eccentric internal gear member 27', so that the engagement portions of both worm members 36' and internal gear member 27' are subject to little deformation or damage, thus rendering the pump as a whole mechanically strong.

Reverting to FIG. 1, a mechanism for moving the main shaft 20 in its axial direction for adjustment of the plunger stroke includes an adjustment rod 52 concentrically connected to the head 23 of the main shaft 20 through bearings 53 and 54. while movable in the axial direction jointly with the adjustment rod 52, the main shaft 20 can also make a rotation independently of the adjustment rod 52. The adjustment rod 52 penetrates a hole 55 bored through a guide member 56 fixed to the upper end of the upper rest 25. On the peripheral wall of the adjustment rod 52 is mounted a key 57 which is guided through a keyway 58 cut out in the inner wall of the hole 55 so as to enable the adjustment rod 52 to make an axial movement without any rotation. To the upper end of the guide member 56 is rotatably fitted a worm wheel 60 through a bearing 59. The worm wheel 60 has a threaded hole 61 bored at the center. The adjustment rod 52 has a threaded portion 62 formed on the upper periphery, and is fitted into the threaded hole 61 of the worm wheel 60 through said threaded portion 62. The worm wheel 60 engages a second worm 63 rotatably fitted to the housing 10 through a worm shaft 64 (FIG. 2).

The worm shaft 64 penetrates at one end the side wall of the housing 10 and projects to the outside. To the projecting end of the worm shaft 64 is fitted a manually operable handle 65 for rotation of the worm 63. Near the projecting end of the worm shaft 64 is fixed a gear 66 which is coupled with an internal gear 67 through a reduction mechanism 68. On the outer periphery of the internal gear 67 is provided a graduated scale to indicate the stroke length of the plunger 41 resulting from the rotation of the worm 63. To the opposite end of the worm shaft 64 is connected the later described electric servo motor 69 mounted on the housing 10.

When the worm 63 is rotated by the manual or power-driven handle 65 or by the servo motor 69, the adjustment rod 52 is nonrotatably moved upward or downward according to the direction in which the worm wheel 60 is made to rotate. As a result, the main shaft 20 and eccentric cam disk 26 are moved in the axial direction to vary the eccentricity of rotation of the eccentric cam ring 27, thereby adjusting the stroke length of the plunger 41. This adjustment can be effected even while the main shaft 20 is rotated for reciprocation of the plunger 11, thus eliminating the necessity of purposely stopping the pump operation for such adjustment.

The servo motor 69 is controlled by the servo system shown in FIG. 8. Where the servo system is in a stable condition, namely, where the desired value $V_1$ and a detected value $V_2$ coincide with each other, then a regulator 70 applies a prescribed input voltage Em to a comparator 71 corresponding to the desired value $V_1$. The desired value $V_1$ and a detected value $V_2$ vary with numerous controlling factors, for example, the pH and temperature of a fluid as well as the pressure with which it is made to flow through the fluid circuit 47. On the other hand, a potentiometer 72 is designed to apply a prescribed feedback voltage Ep according to the stroke length of the plunger 41. While, however, the entire pump system remains stable, the feedback voltage Ep is made equal to the aforesaid input voltage Em. In such case, no differential voltage Ei appears between the input and feedback voltages, preventing the operation of servo motor 69.

Variation of the aforesaid controlling factors caused by external disturbance leads to change in a detected value V₂ and consequently in the value of the above-mentioned prescribed input voltage Em. In such case, the servo motor 69 is put into operation by the resulting differential voltage Ei to adjust the stroke length of the plunger 41 for stabilization of the pump system. The plunger stroke thus adjusted is immediately converted to a feedback voltage Ep by the potentiometer 72, and the servo motor 69 continues operation until there appears no difference between the input voltage Em and the feedback voltage Ep. Thus the servo motor 69 plays the role of automatically adjusting the plunger stroke so as to enable a fluid to flow through the fluid circuit 47 under a desired condition.

Referring to FIGS. 1 and 2, the other end of the worm shaft 12 is concentrically fitted with a screw pump 73, from which a pipe 74 projects for communication with a passageway 75 (FIG. 1) formed in the upper rest 25. The housing 10 is filled with lubricant oil up to a level indicated by, for example, line IV—IV. When the worm shaft 12 rotates, the lubricant oil is sucked upward by the aforesaid screw pump 73 up to the passageway 75 and the cavity 24. After automatically lubricating rotating parts such as a bearing and sliding parts, the lubricant oil is again collected in the bottom of the housing 10, thus eliminating the necessity of providing any additional lubricant feeder for maintenance of the system.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A variable metering pump comprising:
   a main shaft so designed as to make a rotation as well as an axial movement;
   drive means for rotating said main shaft;
   adjusting means for axially displacing said main shaft;
   a double eccentric cam mechanism comprising:
     an eccentric disk fixed to said main shaft,
     an eccentric ring having its inner peripheral wall engaged with the outer peripheral wall of said eccentric disk and positioned eccentrically with respect to said eccentric disk; and
     coupling means for connecting said eccentric ring to said eccentric disk, said coupling means comprising:
       a helical keyway cut out in the outer peripheral wall of said eccentric disk; and
       a ball-shaped projection protruding from the inner wall of said eccentric ring and engaging with said keyway;
   a plunger coupled to the periphery of said eccentric ring for producing a reciprocating stroking movement upon rotation of said main shaft by said drive means; and
   a pump unit coupled to said plunger for metering a fluid in accordance with the stroke of said plunger, whereby axial movement of said shaft by said adjusting means will rotate said eccentric ring relative to said eccentric disk thereby varying the eccentricity of rotation of said ring when said drive shaft is rotated, which changes the stroke of said plunger and changes the metering of fluid from said pump unit.

2. A variable metering pump according to claim 1 wherein said adjusting means consists of an adjustment shaft concentrically connected to said main shaft, rotatable relative to said main shaft and axially movable jointly therewith and further provided with a threaded portion on the outer peripheral wall;
   a worm wheel bored with a threaded hold engageable with the threaded portion and rotated for axial movement of said adjustment shaft; and
   a worm for rotating said worm wheel.

3. A variable metering pump according to claim 2 wherein said worm is provided with a handle for rotating said worm.

4. A variable metering pump according to claim 3 wherein said worm is connected to a servo motor for rotating said worm.

5. A variable metering pump according to claim 1 wherein there is further provided a lubricating system for lubricating reciprocating parts and rotating parts, said lubrication system comprising:
   a source of a lubricant,
   a pump means coupled to said drive means and having an inlet connected to said source of lubricant,
   a conduit means for conducting the said lubricant from said pump means; and
   a passageway connected to said conduit means for feeding said lubricant to said reciprocating parts and said rotating parts.

6. A variable metering pump according to claim 1 further including a stop means for preventing the axial movement of said eccentric ring.

7. A variable metering pump comprising:
   a main shaft so designed as to make a rotation as well as an axial movement;
   drive means for rotating said shaft;
   adjusting means for axially displacing said main shaft;
     a double eccentric cam mechanism comprising:
     an eccentric disk fixed to said main shaft,
     an eccentric ring having its inner peripheral wall engaged with the outer peripheral wall of said eccentric disk and positioned eccentrically with respect to said eccentric disk; and
     coupling means for connecting said eccentric ring to said eccentric disk, said coupling means comprising:
       a plurality of helical spline grooves cut out in the inner peripheral wall of said eccentric ring, and
       a plurality of helical spline teeth protruding from the outer peripheral wall of said eccentric disk and engaging with said spline grooves;
   a plunger coupled to the periphery of said eccentric ring for producing a reciprocating stroking movement upon rotation of said main shaft by said drive means; and
   a pump unit coupled to said plunger for metering a fluid in accordance with the stroke of said plunger whereby axial movement of said shaft by said adjusting means will rotate said eccentric ring relative to said eccentric disk thereby varying the eccentricity of rotation of said ring when said drive shaft is rotated, which changes the stroke of said plunger and changes the metering of fluid from said pump unit.

8. A variable metering pump according to claim 7, wherein said adjusting means comprises:
an adjustment shaft concentrically connected to said main shaft, and rotatable relative to said main shaft and axially movable jointly therewith, said adjustment shaft having a threaded portion on the outer peripheral wall thereof;
a worm wheel having a threaded hole engagable with said threaded portion of said adjustment shaft whereby rotation of said worm wheel will produce axial movement of said adjustment shaft; and
a worm for rotating said worm wheel.

9. A variable metering pump according to claim 8 wherein said worm is provided with a handle for rotating said worm.

10. A variable metering pump according to claim 8 wherein said worm is provided with a servo mechanism for rotating said worm.

11. A variable metering pump according to claim 7 where there is further provided a lubricating system for lubricating reciprocating parts and rotating parts said lubricating system comprising:
a source of lubricant,
a pump means coupled to said drive means and having an inlet connected to said source of lubricant,
a conduit means for the said lubricant from said pump means; and
a passageway connected to said conduit means for feeding said lubricant to said reciprocating parts and rotating parts.

12. A variable metering pump according to claim 7, further including stop means for preventing axial movement of said eccentric ring.

* * * * *